United States Patent [19]
DiGiorgio, Jr.

[11] Patent Number: 6,076,450
[45] Date of Patent: Jun. 20, 2000

[54] FRESH BEVERAGE BREW CUP LID

[76] Inventor: Joseph H. DiGiorgio, Jr., 71 Hillcroft Way, Newtown, Pa. 18940

[21] Appl. No.: 09/053,799

[22] Filed: Apr. 2, 1998

[51] Int. Cl.[7] ..................................................... A47G 19/14
[52] U.S. Cl. ............................... 99/298; 99/304; 99/323; 99/323.3; 210/244; 210/314; 210/474; 210/495
[58] Field of Search ............................. 99/279, 295, 298, 99/304, 323, 323.3; 210/244, 314, 474, 475, 495

[56] References Cited

U.S. PATENT DOCUMENTS

| | | |
|---|---|---|
| 3,971,305 | 7/1976 | Daswick .................................. 210/474 |
| 4,560,475 | 12/1985 | Kataoka . |
| 4,721,835 | 1/1988 | Welker . |
| 5,277,103 | 1/1994 | Cox . |
| 5,775,205 | 7/1998 | Melton ....................................... 99/279 |

FOREIGN PATENT DOCUMENTS 812235  5/1937  France ..................................... 99/295

*Primary Examiner*—Matthew O. Savage
*Attorney, Agent, or Firm*—Gregory J. Gore

[57] ABSTRACT

A brewer device for brewing single servings of a beverage, while also functioning as a cup closure lid. The lid includes a filter assembly to hold a brew substance, such as coffee grounds, a lip to secure said device to the mouth of a cup, and a frangible tab to allow consumption of the beverage without removing the lid. To enhance the aroma of the beverage while it is being consumed, the brew substance is held on top of the lid just below the position of the consumer's nose. Other brew substances, such as tea, cocoa, bouillon, etc., may be used.

6 Claims, 1 Drawing Sheet

FRESH BEVERAGE BREW CUP LID

FIELD OF THE INVENTION

The present invention relates to a coffee filter assembly for a cup. More particularly, a lid containing a meshed filter holds coffee and attaches to the top of a cup to also act as a lid.

BACKGROUND OF THE INVENTION AND DESCRIPTION OF PRIOR ART

A typical coffee maker is comprised of a chamber to hold water, a heating unit to heat the water, a filter assembly that holds coffee, a passageway to pass water from the chamber to the filter, and a container to hold a hot beverage that passes through the filter. This device is primarily used to make larger quantities of a coffee beverage, so is not practical for brewing small quantities of coffee. This device is also difficult to clean and can be time-consuming.

Other coffee makers are designed to make small quantities of coffee One example of a brewing device for small quantities of coffee is shown in Welker, U.S. Pat. NO. 4,721,835. Welker includes a cup that holds coffee grounds and water, a lid with a screen to filter a coffee beverage as it is poured from the cup, and a tube extending above the surface of the lid to allow steam to vent during the heating process. The heating of the water takes place in a microwave.

Another example of a brewing device for small quantities of coffee, Cox, U.S. Pat. No. 5,277,103, has a frame with a handle and a porous pouch to hold coffee. In Cox, the frame is inserted into a cup of hot water and stirred within the cup to force the water through the pouch of coffee and is removed after the coffee beverage has been made As a result, the brewing process takes place in the single cup.

Similarly, in U.S. Pat. No. 4,560,475, Kataoka brews coffee in a single cup. A filter assembly attaches to the top of a cup and allows hot water to pass through a filter. The Kataoka filter assembly is then removed for consumption of a coffee beverage.

Similarly, in the present invention a freshly brewed beverage is made by pouring hot water through a filter into a cup, however unlike the prior art, the present device does not have to be removed for consumption of the beverage. The device has a drinking opening temporarily covered by a frangible tab. As a result, not only does the device attached to the top of the cup act as a brewing device, but it also acts as a lid to prevent spillage and retain heat.

SUMMARY OF THE INVENTION

The present invention is directed to a brewing device which also functions as a container lid. The lid includes a top filter and bottom filter that holds a brew substance coffee within the sides of the lid. The lid is attached to the mouth of the cup by a lip around the bottom edge of the lid. In operation, hot liquid is poured through the top filter and bottom filter, contacts the coffee grounds between the filters and exits out of the bottom filter into the cup until the cup is filled the desired amount. The beverage may then be consumed through a push-through tab which provides an opening in the lid. Alternatively, the lid may be easily removed to consume the beverage.

It is a further object of the present invention to enhance the consumption of a brewed beverage. Consumers find that the most important qualities of a brewed beverage are flavor, aroma, and temperature. The present device better maintains proper temperature because the lid can remain on the cup after brewing; flavor is enhanced because each individual cup is freshly brewed just before it is consumed; and finally, aroma is enhanced by retaining the brew substance on top of the lid positioned close to the consumer's nose.

More specifically, the applicant has invented a brewer assembly for brewing a hot beverage, such as coffee or the like, comprising: a lid attached to the top of a cup, the lid comprises a first and a second filter, circular sides, a lip that attaches along the entire periphery of a cup mouth, and a containment pocket bounded by the filters and sides for holding a quantity of a brew substance. The first filter is located at the top of the containment pocket and the second filter is located at the bottom of the containment pocket such that a brewed beverage is dispensed into the cup after pouring a hot liquid from above which first passes through the filters and brew substance. The sides of the lid are plastic, and the mouth of the cup and lip of the lid are circular. The top filter of the present invention is a mesh screen and is of a size to permit the flow of hot liquid through the screen, yet to prevent the passage of brew substance through the screen. The bottom filter may be composed of paper. A push-through tab at the front of the lid covers a drinking aperture.

DESCRIPTION OF THE PREFERRED EMBODIMENT

Figure 1:
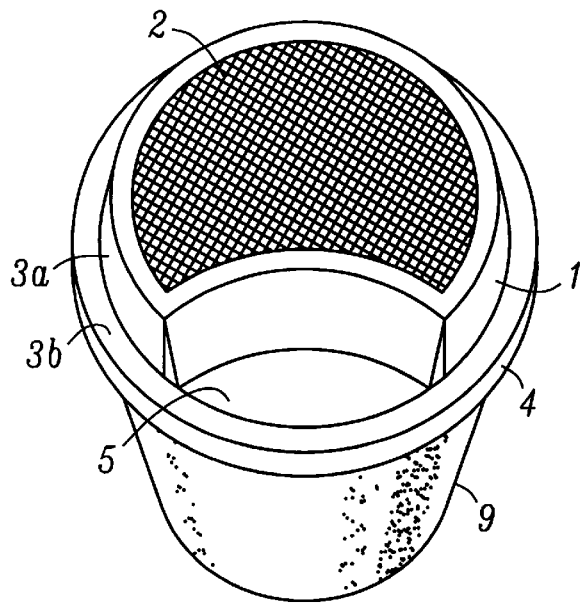
FIG. 1 is a top front isometric view of the coffee brew cup lid of the present invention.
Figure 2:
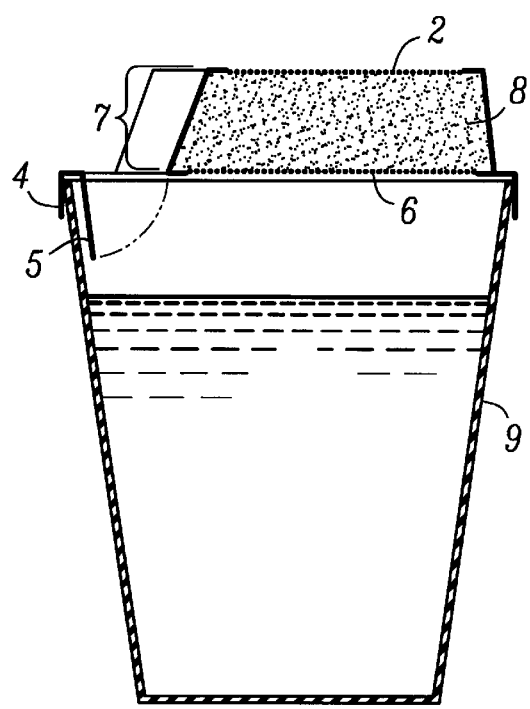
FIG. 2 is a side sectional view of the coffee brew cup lid of FIG. 1.

FIG. 1 illustrates the brewing assembly of the present invention having a lid 1 with a top filter 2, planar imperforate base wall 3a, imperforate peripheral sidewall 3b, lip 4, and tab 5, which is affixed to the top of cup 9. As shown in FIG. 2 in this embodiment, a brew substance, coffee 8, is stored within a containment pocket 7 bounded by side walls 3 of the lid between filter 2 and filter 6. As shown in FIG. 2, the containment pocket 7 is disposed above the base wall 3a. Filter 2 and filter 6 may be mesh screens. Alternatively, filter 6 may be a porous paper of the type used to filter brew substances. The lid fits on top of the cup 2 and is secured by lip 4. The lid 1 is preferably made of a plastic material. As the hot water is poured into the top of the lid through filter 2, it passes through the coffee grounds in the containment pocket 7 and exits at the bottom of the lid into the cup. Thus, the lid 1 functions as a brewing device by which hot water that flows through lid 1 enters the cup as a freshly brewed beverage.

At the end of the brewing process, the lid 1 remains on top of the cup and serves as a closure. At all times, coffee grounds remain in the containment pocket 7 of lid 1 under filter 2 which has a mesh size appropriate to permit the free flow of water, yet to prevent the brew substance from escaping. The lid 1 provides closure around the entire periphery of the mouth of the cup to prevent heat from escaping the cup, so the coffee beverage will remain hot longer than if the lid 1 had to be removed after the brewing process. Without removing the lid 1, the beverage may be consumed through a drinking aperture temporarily covered by frangible, push-through tab 5 located between the peripheral sidewall 3a and the lip 4. The brewed substance remains in the lid which is brought close to the nose of the person consuming the beverage using the drinking aperture. This enhances consumption of the beverage by the aroma of the brew substance emanating from the top of the lid. It is a unique feature of the present invention to provide this advantage while, at the same time, keeping most of the top of the cup covered to prevent heat loss.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention. For example, although the preferred embodiment has been described as a brewing device for coffee, any suitable brew substance, such as tea, cocoa, bouillon, etc., may be used.

What is claimed is:

1. A brewer assembly for brewing a hot beverage comprising:

a cup having an open top, said open top defining a cup mouth:

a lid attached to the open top of said cup, said lid comprising a first filter and a second filter, a generally planar imperforate base wall, an imperforate peripheral sidewall extending upwardly from said base wall, wherein said first filter is positioned at an upper end of said sidewall and said second filter is positioned at a lower end of said sidewall, wherein an outer periphery of said base wall includes a lip extending downwardly therefrom that attaches along the entire periphery of said cup mouth, and a push through tab for defining a drinking aperture extending through said base wall, wherein said push through tab is positioned between said peripheral sidewall and said lip;

a containment pocket bounded by said filters and said peripheral sidewall for holding a quantity of a brew substance, wherein said containment pocket is located above said base wall; and whereby a brewed beverage is dispensed into said cup after pouring a hot liquid from a location above said first filter which passes through said filters and said brew substance which is located above said base wall such that the nose of the consumer is adjacent to said brew substance while drinking from said drinking aperture.

2. The brewer assembly of claim 1, wherein said walls of said lid are of plastic.

3. The brewer assembly of claim 1, wherein said mouth of said cup and said lip of said lid are circular.

4. The brewer assembly of claim 1, wherein said first filter is a mesh screen.

5. The brewer assembly of claim 1, wherein said second filter is composed of paper.

6. The brewer assembly of claim 1, further comprising said quantity of a brew substance, and wherein said brew substance is coffee.

* * * * *